Figure 1:
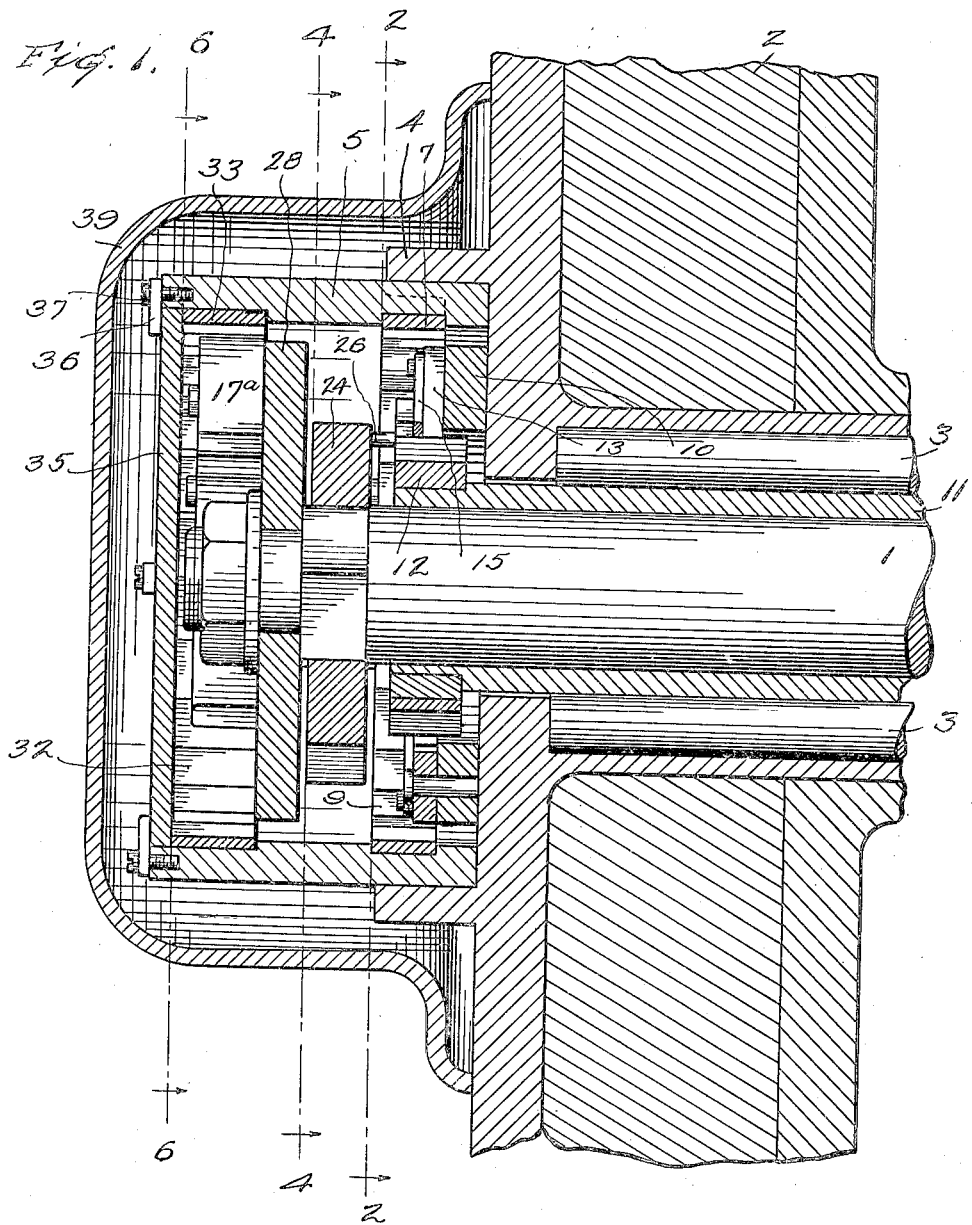

June 22, 1926.  1,589,793

W. F. DIDEN

POWER TRANSMISSION MECHANISM

Filed June 16, 1924   5 Sheets-Sheet 1

Inventor
W. F. Diden

WITNESSES

By Richard B. Owen,
Attorney

June 22, 1926.

W. F. DIDEN

POWER TRANSMISSION MECHANISM

Filed June 16, 1924

1,589,793

5 Sheets-Sheet 3

Inventor
W. F. Diden

Witnesses

By Richard B. Owen
Attorney

June 22, 1926.
W. F. DIDEN
POWER TRANSMISSION MECHANISM
Filed June 16, 1924    5 Sheets-Sheet 4
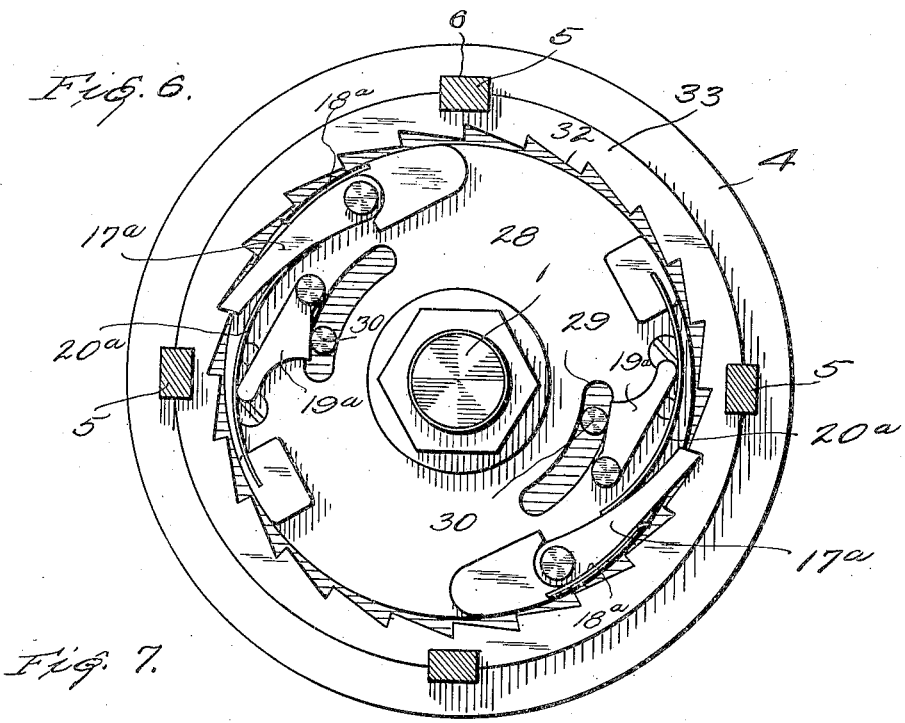
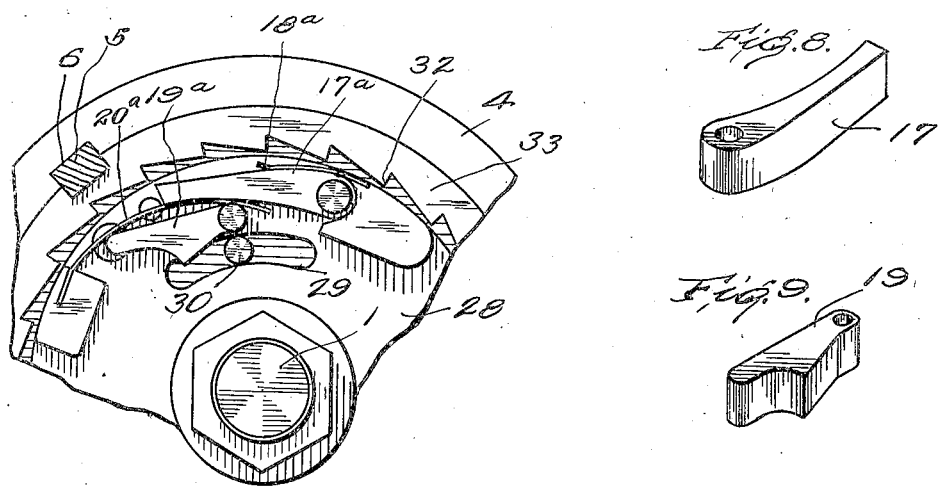
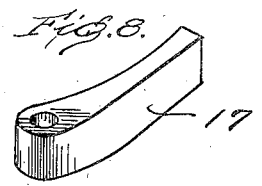
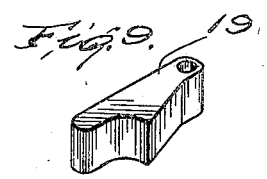
Inventor
W. F. Diden

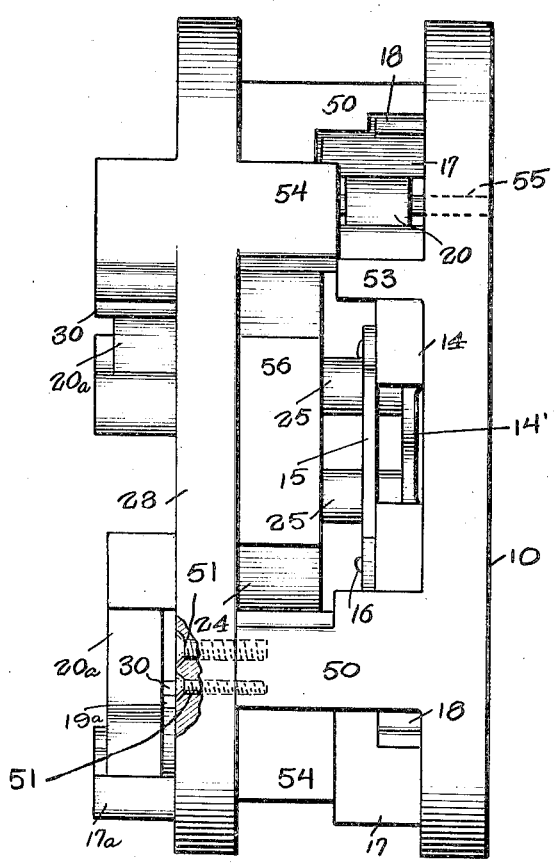

Patented June 22, 1926.

1,589,793

UNITED STATES PATENT OFFICE.

WILLIAM F. DEDEN, OF MILTON, FLORIDA.

POWER-TRANSMISSION MECHANISM.

Application filed June 16, 1924. Serial No. 720,448.

The present invention relates to a power transmission mechanism, and has particular reference to an improved mechanism for rotating the drive wheels of automobiles or trucks so as to eliminate the use of common differential mechanisms now utilized. While the invention is adapted for various uses it is herewith particularly illustrated in conjunction with the axle and wheel of a motor vehicle, the device being adapted to automatically clutch a rotatable member to a rotated member in either forward or backward movement so long as the rotatable member is desired to be driven, but permitting the rotated member to overrun under certain conditions, such as in making a turn in the case of motor vehicles and the like.

The objects of the invention are, to generally improve devices of this character, to simplify the construction thereof, to insure certain and positive operations, to reduce lost motion, to provide a structure which is reliable, comparatively inexpensive to manufacture, durable, strong, efficient and well adapted to the purpose for which it is desired.

With the above and numerous other objects in view as will appear as the description progresses, the invention resides in certain novel features of construction, and in the combination and arrangement of parts as will be hereinafter more fully described and claimed.

Figure 2:
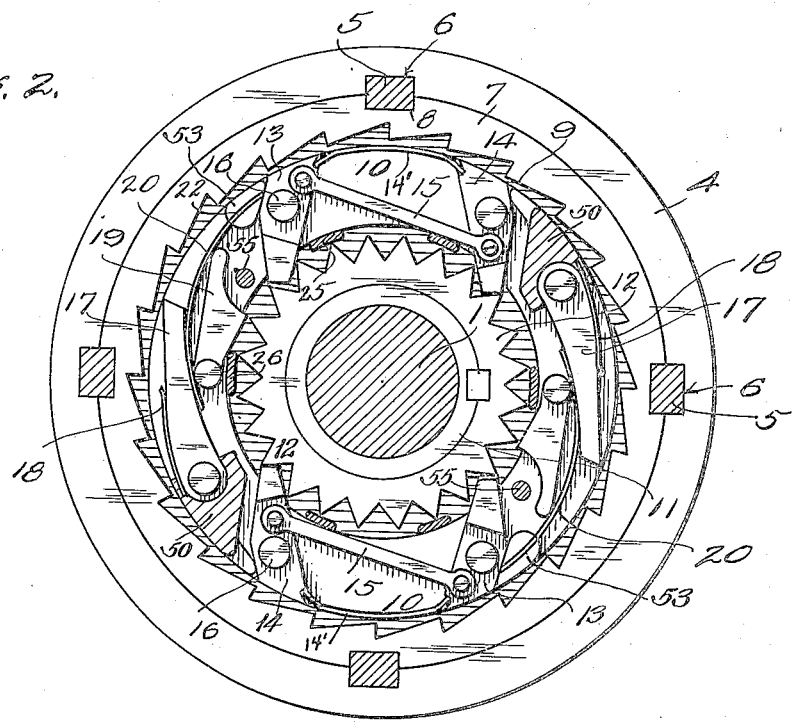
Figure 3:
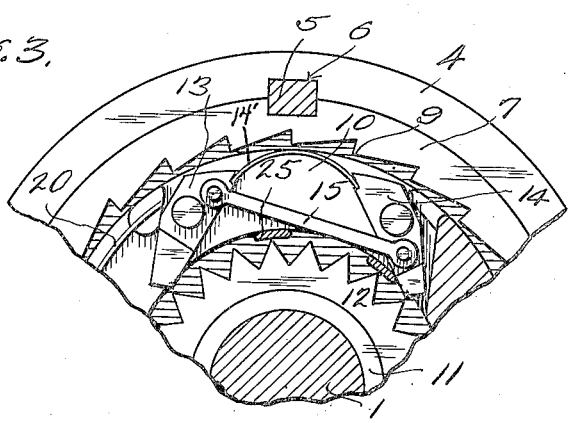
Figure 4:
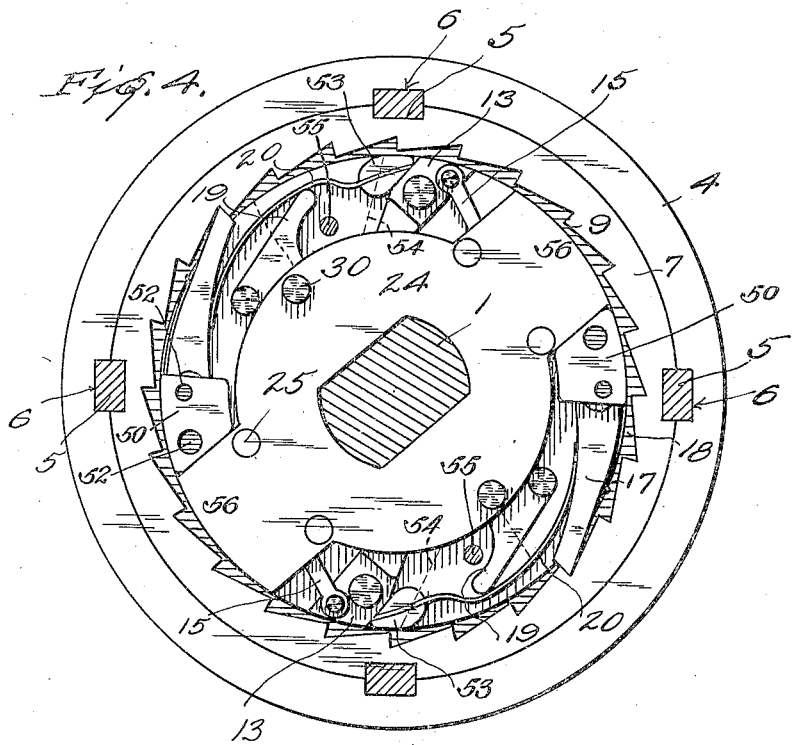
Figure 5:
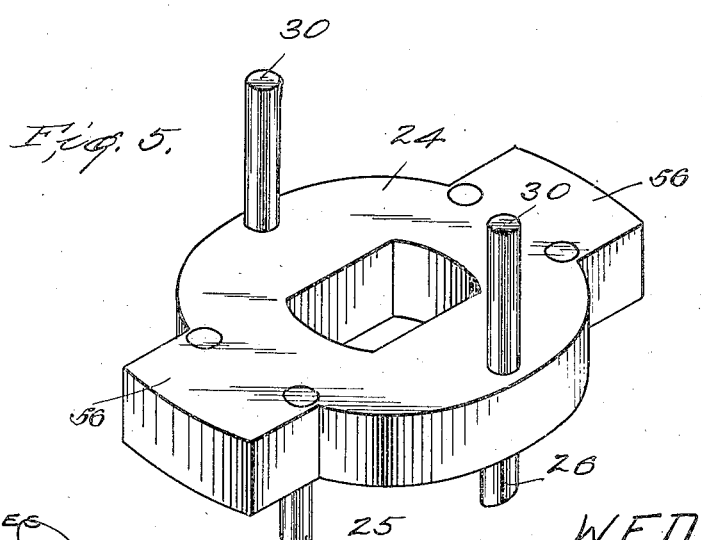

In the drawings:

Figure 1 is a longitudinal section through an assembly of a wheel hub and axle showing my differential clutch mechanism associated therewith, Figure 2 is a transverse section taken substantially on the line 2—2 of Figure 1 looking in the direction of the arrows, Figure 3 is a fragmentary view similar to Figure 2 showing the parts in different positions, Figure 4 is a transverse section taken substantially on the line 4—4 of Figure 1 looking in the direction of the arrows, Figure 5 is a detailed perspective view of the plate which is adapted to rotate with the axle, Figure 6 is a transverse sectional view taken substantially on the line 6—6 of Figure 1 looking in the direction of the arrows, Figure 7 is a fragmentary view similar to Figure 6 showing the parts in different positions, Figures 8 and 9 are perspective views of dogs used in conjunction with the invention, and Figure 10 is an enlarged edge elevational view of parts disposed within the ratchet rings of the device shown in Figure 1.

Referring to the drawings in detail, it will be seen that 1 designates the rotated member in the form of an axle and 2 designates the rotatable member in the form of a wheel hub. The wheel hub 2 is rotatably mounted on the axle casing by means of roller bearings 3 or in any other suitable manner. An annular flange 4 projects outwardly from the outer face of the wheel hub 2 and a plurality of key bars 5 are projected therefrom, being fitted in grooves 6. A ring 7 is provided with a plurality of notches 8 for receiving the key bars 5 and on its internal face is provided with ratchet teeth 9. A ring 10 of smaller diameter than the ring 7 is positioned within the confines of the flange 4 and the key bars 5. The axle casing 11 is mounted over the axle 1 and it is within this casing that the axle 1 is actually rotatable. This casing has keyed thereto a star wheel or gear 12. A plurality of dogs 13 and 14 are pivoted to the ring 10. Springs 14' hold these dogs normally in engagement with gear 12. These dogs 13 and 14 are arranged in pairs and connected by rods 15. Each rod 15 is pivoted to one dog 13 of one pair outwardly of the pivot 16 of said dog and to the other dog 14 of such pair inwardly of the pivot of the latter so that these dogs of each pair operate together to engage or disengage the teeth of the gear 12. A second series of dogs 17 are pivoted to the ring 10 and springs 18 normally hold them out of engagement with the ratchet teeth 9 of the ring 7. A series of pivoted arms 19 are mounted on the ring 10 for engaging springs 20 which are fixed at one end as at 22 to the ring 10 while the other ends are engaged with the dogs 17 so that these arms 19 may be swung to tension the springs 20 for overcoming the springs 18 and throwing the dogs 17 into engagement with the ratchet teeth 9 of the rings 7. These arms 19 are somewhat in the form of cams as will be clearly understood hereinafter and will be referred to from now on as cam arms.

A plate 24 is mounted on, to rotate with, the end of axle 1. A plurality of pins 25 and 26 project from one face of this plate and move along the interior periphery or edge of the ring 10. The pins 25 are adapted to engage dogs 13 while the pins 26 actuate the cam arms 19. A disk 28 is mounted on the extremity of the axle 1 beyond the plate 24 and the latter and the axle are rotatable independently of the disk 28. This disk 28 is provided with a pair of diametrically opposed concentric arcuate slots 29 through which project pins 30 extending from the opposite face of the plate 24 from which pins 25 and 26 extend. A series of dogs 17$^a$ are pivoted to the disk 28 adjacent its periphery being normally held by springs 18$^a$ out of engagement with the ratchet teeth 32 on the interior of a ring 33 which is carried by the key bars 5 similarly as is carried the ring 7. These dogs are adapted to be actuated by springs 20$^a$ mounted adjacent the periphery of and on the disk 28 and actuated by the cam arms 19$^a$ which in turn are actuated by the pins 30 extending through the slots 29.

The ring 10 has a pair of lugs 50 rigid with the outer side thereof and disposed at diametrically opposed points as shown in Figures 2 and 4, and these lugs 50 project laterally outwardly and flatly engage the inner side of the disk 28 as shown in Figure 10. The lugs 50 are rigidly secured to the disk 28 by any suitable means, such as screws 51 passing through the disk 28 and threaded into sockets 52 provided in the outer ends of the lugs 50. The springs 20 are anchored to lugs 53 which are rigid with and project laterally from the outer side of the ring 10, and rigid with and projecting inwardly from the disk 28 at diametrically opposed points are a pair of lugs 54 whose inner ends abut the outer ends of the lugs 53 and carry rigid pins 55 which project into openings in the ring 10. The ring 10 and disk 28 are thus rigidly connected and maintained in spaced relation as well as supported by the axle 1 due to mounting of the disk 28 on the axle as set forth above. The lugs 50 and 54 are in spaced relation, and rigid with and projecting outwardly from the plate 24 are a pair of aligned arms 56 each of which projects and is movable between a lug 50 and the adjacent lug 54. It is noted that the dogs 17 and ratchet ring 7 are arranged reversely to the dogs 17$^a$ and ratchet ring 33 so that oppositely acting ratchet devices are had. An end plate 35 is attached to the extremities of the key bars 5 by means of lugs 36 held in place by screws or in any other suitable manner as is shown at 37. A suitable housing 39 is disposed over the mechanism just described and may be held in place as any ordinary hub cap or guard.

Considering the device as illustrated in the accompanying drawings it will be seen that if the axle 1 is rotated in a clockwise direction, the plate 24 will be likewise rotated so that the pins 25 are moved and certain of the latter engage the dogs 14 for causing the dogs 13 and 14 to be disengaged from the gear 12 immediately prior to engagement of the arms 56 of plate 24 with the lugs 50. The pins 26 are also moved at the same time to actuate the cam arms 19 so as to force the dogs 17 into engagement with the ratchet teeth 9 of ring 7 and, as the arms 56 engage the lugs 50 immediately after the dogs 13 and 14 are released from the gear 12, the disk 28 and ring 10 are caused to rotate with the axle so that the dogs 17 drive the ratchet ring 7 for rotating the wheel in a similar direction with the axle. It will also be readily understood that the wheel is capable of overrunning the axle as would be necessary with the outside wheel should the vehicle be turning a corner when the wheel overruns the driving mechanism, the active ring 7 or 33 is allowed to ratchet over the cooperating dog 17 or 17$^a$, by reason of the yieldable nature of the actuating means for said dog or the springs interposed between the same and the actuating pins for said dogs. This phenomena is so clearly understood by those skilled in this art that it hardly needs further detailed explanation. Under the circumstances just described it will be seen that the dogs 17$^a$ shown in Figure 6 will be idle or inactive, that is, the dogs 17$^a$ will be out of engagement with the ratchet teeth on ring 33 as shown in Figure 7. In Figure 3 the pins 25 are shown in the position just described to disengage the dogs 13 and 14 from the gear 12. It is understood, of course, that these dogs 13 and 14 are actuated together so as to both be in engagement with the teeth of the gear or both out of engagement with the gear, the two positions being clearly illustrated in Figures 2 and 3 of the drawings.

Now considering the reverse operation, that is, considering the axle 1 to be rotating in a counter-clockwise direction and referring particularly to the structure illustrated in Figures 6 and 7 it will be noted that the pins 30 will be moved from the position illustrated in Figure 7 to the position illustrated in Figure 6, that is, so as to actuate the cam arms 19$^a$ to tension springs 20$^a$ and force the dogs 17$^a$ into engagement with the teeth 32 of the ring 33. Thus the wheel will be rotated in a counter-clockwise direction with the axle and in this operation it is also to be noted that the pins 25 will be disposed in an opposite position from that shown in Figure 3, that is, the pin 25 shown to the left of Figure 3 and the other corresponding pin would be engaged with the dogs 13 instead of the pin to the right engaging dog 14.

Thus, the arms 56 of plate 24 will engage the lugs 54 to drive the disk 28 and ring 10 with the axle immediately after the pins 25 release the dogs 13 and 14 from the gear 12, and the dogs 17ª will therefore drive the ratchet ring 33 and the vehicle wheel to which the latter is keyed, the dogs 17 being then released are inactive as shown in Figure 2. The dogs 13 and 14 engage the star wheel or gear 12, which is fixed to the stationary axle casing or housing 11, so as to hold the disk 28, ring 10 and associated parts stationary while the axle 1 and the plate 24 with its pins 25, 26 and 30 rotate so that said pins 26 or 30 may positively effect engagement of the dogs 17 with the ratchet ring 7 or the dogs 17ª with the ratchet ring 33. However, in order to prevent damage to the various parts, it is essential that the dogs 13 and 14 be released to permit the disk 28 and ring 10 to turn with the axle and plate 24 before the arms 56 engage the lugs 50 or the lugs 54 drive said disk 28 and ring 10, and the pins 25 are accordingly disposed to effect release of the dogs 13 and 14 immediately prior to engagement of said arms 56 with said lugs 50 or 54.

What I claim as new is:

1. In combination, a driving member, a driven member, a clutch therebetween including a supporting member, a clutch controlling plate fixed to the driving member and capable of limited rotation relative to said supporting member of the clutch and having pins extended therefrom for controlling the movable clutch elements of the clutch, a brake mechanism including a stationary gear and dogs rotatable with the supporting member of the clutch, some of said pins of the controlling member being engageable with the dogs to hold them out of engagement with the gear when other pins thereof are actuating the clutch elements.

2. In combination, a driving member, a driven member, a clutch therebetween including a supporting member, a clutch controlling member fixed to the driving member and capable of limited rotation relative to the supporting member of the clutch, said clutch comprising a second member fixed to the driven member and movable therewith, one of said clutch members being provided with ratchet teeth, the other clutch member being rigid and provided with dogs movable relative thereto and engageable with said ratchet teeth, and yieldable means to normally move said dogs relative to said other clutch member out of engagement with said ratchet teeth, said clutch controlling member being provided with pins for moving the dogs into engagement with the ratchet teeth.

3. In combination, a driving member, a driven member, a clutch therebetween including a supporting member, a clutch controlling member fixed to the driving member and capable of limited rotation relative to the supporting member of the clutch, said clutch comprising a second member fixed to the driven member and movable therewith, one of said clutch members being provided with ratchet teeth, the other clutch member being provided with dogs engageable with said ratchet teeth, and said clutch controlling member being provided with pins for actuating the dogs into engagement with the ratchet teeth, and a brake mechanism including a stationary member and elements rotatable with the supporting member of the clutch, other pins of said controlling member being engageable with the brake elements to hold them out of engagement with the stationary member of the brake mechanism when the clutch mechanism is actuated so that its dogs engage the ratchet teeth.

4. In combination, a driving member, a driven member, oppositely acting one-way clutches therebetween including a common support, and a clutch controlling means including a member fixed to the driving member and capable of limited rotation relative to the support of the clutches, said clutch controlling means including means for releasing one of said clutches and applying the other clutch when said member of the controlling means is rotated in one direction relative to the clutch support and for releasing said other clutch and applying said one clutch when rotated in the other direction relative to said clutch support, a stationary member, brake means associated with said stationary member to prevent rotation of said clutch support when the clutches are released, and means associated with said member of the clutch controlling means for releasing said brake means immediately before the last named member reaches its limit of movement relative to the clutch support when turning in either direction to apply one of said clutches.

5. In combination, a driving member, a driven member, oppositely acting one-way clutches therebetween including a common support, and a clutch controlling means including a member fixed to the driving member and capable of limited rotation relative to the support of the clutches, said clutch controlling means including means for releasing one of said clutches and applying the other clutch when said member of the controlling means is rotated in one direction relative to the clutch support and for releasing said other clutch and applying said one clutch when rotated in the other direction relative to said clutch support, a stationary member, brake means associated with said stationary member to prevent rotation of said clutch support when the clutches are released, and means associated with said member of the clutch controlling means for releasing said brake means immediately before the last named member reaches its limit of movement relative to the clutch support when turning in either direction to apply one of said clutches, said brake means embodying oppositely acting dogs carried by the clutch support and engageable with the stationary member.

6. In combination, a driving member, a driven member, oppositely acting one-way clutches therebetween including a common support, and a clutch controlling means including a member fixed to the driving member and capable of limited rotation relative to the support of the clutches, said clutch controlling means including means for releasing one of said clutches and applying the other clutch when said member of the controlling means is rotated in one direction relative to the clutch support and for releasing said other clutch and applying said one clutch when rotated in the other direction relative to said clutch support, a stationary member, brake means associated with said stationary member to prevent rotation of said clutch support when the clutches are released, and means associated with said member of the clutch controlling means for releasing said brake means immediately before the last named member reaches its limit of movement relative to the clutch support when turning in either direction to apply one of said clutches, said brake means embodying pairs of oppositely acting dogs operatively connected so as to be simultaneously engaged or released when either of the same is actuated, and said stationary member embodying a star gear engageable by said dogs.

7. In combination, a driving member, a driven member, oppositely acting one-way clutches therebetween, means to normally yieldingly release said clutches, and positive means including a member fixed to the driving member for applying one of said clutches when the driving member is rotated in one direction and for applying the other clutch when said driving member is rotated in the opposite direction, said last named means further embodying pins rigid with the member fixed to the driving member and cam arms movable by said pins and having yieldable operative connections with the movable elements of said clutches.

In testimony whereof I affix my signature.

WILLIAM F. DIDEN.